(12) United States Patent
Bronstein

(10) Patent No.: US 7,841,940 B2
(45) Date of Patent: Nov. 30, 2010

(54) HUMAN TEST BASED ON HUMAN CONCEPTUAL CAPABILITIES

(75) Inventor: Alexandre Bronstein, Palo Alto, CA (US)

(73) Assignee: Astav, inc, Pacifica, CA (US)

( * ) Notice: Subject to any disclaimer, the term of this patent is extended or adjusted under 35 U.S.C. 154(b) by 527 days.

(21) Appl. No.: 10/619,238

(22) Filed: Jul. 14, 2003

(65) Prior Publication Data

US 2005/0015257 A1     Jan. 20, 2005

(51) Int. Cl.
| A63F 13/02 | (2006.01) |
| A63F 13/10 | (2006.01) |
| A63F 13/12 | (2006.01) |
| A63F 9/18 | (2006.01) |
| G09B 7/02 | (2006.01) |
| G09B 3/02 | (2006.01) |
| G06F 21/00 | (2006.01) |
| G06F 3/048 | (2006.01) |
| G06F 15/16 | (2006.01) |
| G06F 7/04 | (2006.01) |
| G06F 17/30 | (2006.01) |
| H04L 9/32 | (2006.01) |

(52) U.S. Cl. .............................. 463/29; 463/30; 463/31; 463/9; 434/323; 434/327; 434/332; 434/335; 434/353; 434/362; 705/51; 705/75; 709/217; 709/218; 709/219; 709/229; 713/185; 713/176; 715/741; 715/763; 726/2; 726/3; 726/4; 726/26; 726/27; 726/28

(58) Field of Classification Search ................. 434/185, 434/323, 327, 332, 335, 353, 362; 707/1, 707/3; 713/202, 188, 185, 176; 463/19, 463/25, 29–38, 9, 40–43; 715/741, 763; 709/217–219, 229; 705/51, 75; 726/2–4, 726/26–28
See application file for complete search history.

(56) References Cited

U.S. PATENT DOCUMENTS 4,305,067 A * 12/1981 Tretiakoff et al. ......... 340/407.2
4,980,829 A * 12/1990 Okajima et al. ................ 704/5

(Continued)

OTHER PUBLICATIONS

"Verification of a Human in the Loop or Identification via the Turing Test," Moni Naor, Sep. 13, 1996.*

(Continued)

*Primary Examiner*—Peter DungBa Vo
*Assistant Examiner*—Matthew D. Hoel

(57) ABSTRACT

A human test that is based on a human conceptual capability. A human test according to the present techniques includes posing a question that is selected to exercise a human conceptual capability, obtaining an answer to the question, and comparing the answer to a correct answer that would be rendered by a human being.

13 Claims, 2 Drawing Sheets

U.S. PATENT DOCUMENTS

| | | | | |
|---|---|---|---|---|
| 5,839,902 | A * | 11/1998 | Wood | 434/130 |
| 6,195,698 | B1 * | 2/2001 | Lillibridge et al. | 709/225 |
| 6,199,102 | B1 * | 3/2001 | Cobb | 709/206 |
| 6,272,458 | B1 * | 8/2001 | Nojima | 704/10 |
| 6,361,322 | B1 * | 3/2002 | Linden Henry | 434/178 |
| 6,493,722 | B1 * | 12/2002 | Daleen et al. | 707/104.1 |
| 6,712,615 | B2 * | 3/2004 | Martin | 434/236 |
| 7,055,823 | B2 * | 6/2006 | Denkewicz, Jr. | 273/304 |
| 2002/0120853 | A1 * | 8/2002 | Tyree | 713/188 |
| 2003/0110400 | A1 * | 6/2003 | Cartmell et al. | 713/202 |
| 2003/0204569 | A1 * | 10/2003 | Andrews et al. | 709/206 |
| 2004/0024817 | A1 * | 2/2004 | Pinkas | 709/203 |
| 2004/0073813 | A1 * | 4/2004 | Pinkas et al. | 713/202 |
| 2004/0199597 | A1 * | 10/2004 | Libbey et al. | 709/207 |
| 2004/0254793 | A1 * | 12/2004 | Herley et al. | 704/270 |
| 2005/0021649 | A1 * | 1/2005 | Goodman et al. | 709/207 |
| 2006/0069546 | A1 * | 3/2006 | Rosser et al. | 704/9 |
| 2007/0196797 | A1 * | 8/2007 | Mitsuyoshi | 434/236 |

OTHER PUBLICATIONS

"Using a Text-to-Speech Synthesizer to Generate a Reverse Turing Test," Tsz-Yan Chan, Nov. 3, 2003.*

"CAPTCHA: Using hard AI Problems for Security," von Ahn, et al., 2003.* von Ahn, et al., "Telling Humans and Computers Apart (Automatically) or How Lazy Cryptographers do AI.".* www.access-board.gov/sec508/summary.htm, downloaded Jan. 21, 2007, effective date of Section 508 of Rehabilitaton Act, Jun. 21, 2001.* www.access-board.gov/sec508/guide/act.htm, downloaded Jan. 21, 2007, text of 29 U.S.C. Sec. 794 (d), Section 508 of the Rehabilitation Act.* www.access-board.gov/sec508/summary.htm, effective date of Section 508 of Rehabilitation Act, Jun. 21, 2001.* www.access-board.gov/sec508/act.htm, text of 29 U.S.C. Sec. 794 (d), Section 508 of the Rehabilitation Act.* www.amazon.com review of von Ahn, www.amazon.com/Telling-humans-computers-apart-automatically/dp/B0006RWYMY.*

"Telling Humans and Computers Apart (Automatically) or How Lazy Cryptographers do AI," by voh Ahn, et al., published 2002 by Carnegie Mellon University School of Computer Science.*

"Applications of Circumscription to Formalizing Common Sense Knowledge," John McCarthy, Stanford University, 1986, downloaded from http://citeseerx.ist.psu.edu/viewdoc/download?doi=10.1.1.67.560&rep=rep1&type=pdf, Dec. 17, 2009.*

Springer Verlag listing for the von Ahn article "CAPTCHA: Using Hard AI Problems for Security," downloaded form http://www.springerlink.com/content/p8t2q8q6bxey8tvx/, Dec. 17, 2009.* von Ahn, Blum, Hopper, and Langford, CAPTCHA: Using Hard AI Problems for Security.

von Ahn, Blum, Hopper, and Langford, Telling Humans and Computers Apart (Automatically) or How Lazy Crptographers do AI.

Computer Pioneer Aids Spam Fight, BBC News, Jan. 8, 2003.

* cited by examiner

HUMAN TEST BASED ON HUMAN CONCEPTUAL CAPABILITIES

BACKGROUND

A variety of circumstances may exist in computer systems and other systems in which it is desirable to use a "human test" to determine whether a communication originates with a human being or with a computer program that imitates a human being. For example, it may be desirable for a provider of a computer-related service that is intended for use by individual users, i.e. by human beings, to determine whether the computer-related service is being accessed by a computer program that imitates a human being.

A computer program that imitates a human being in the context of web communication is commonly referred to as a "bot" which is a shortened version of "robot." Examples of computer-related services that may be intended for use by individual users in the context of web-based communication include email services, personal web page services, personal data storage services, web access accounts, etc.

An unscrupulous party may employ bots to create numerous user accounts with a computer-related service that is intended for individual users. For example, an unscrupulous party may use bots to create numerous user accounts with a free email service and then use the obtained email accounts for mass mailings of spam. Similarly, an unscrupulous party may use bots to create numerous free personal web page accounts and then store large volumes of information on the obtained web storage space.

A provider of a computer-related service may attempt to prevent creation of user accounts by bots by generating a registration form that includes a human test. A prior human test may include an image of a decimal number in a stylized fashion along with a request that the represented number be entered into a form field. Such a prior human test relies on the human capability to recognize stylized numbers. Unfortunately, a bot may employ optical character recognition (OCR) techniques to defeat a human test that relies on number recognition.

SUMMARY OF THE INVENTION

A human test is disclosed that is based on a human conceptual capability. A human test according to the present techniques includes posing a question that is selected to exercise a human conceptual capability, obtaining an answer to the question, and comparing the answer to a correct answer that would be rendered by a human being.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
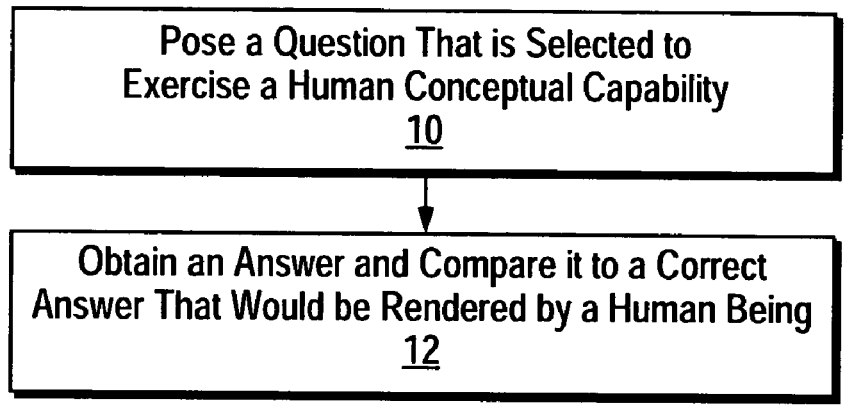
FIG. 1 shows a human test according to the present teachings.

FIG. 1 shows a human test according to the present teachings. At step 10, a question is posed that is selected to exercise a human conceptual capability. At step 12, an answer to the question is obtained and compared to a correct answer that would be rendered by a human being.

One example of a question that exercises a human conceptual capability is a question that exercises a image recognition capability. Another example of a question that exercises a human conceptual capability is a question that exercises a natural language processing capability. Yet another example of a question that exercises a human conceptual capability is a question that exercises a common sense reasoning capability. Another example of a question that exercises a human conceptual capability is a question that exercises a capability to recognize and parse spoken speech. A question posed at step 10 may exercise any combination of image recognition, natural language processing, spoken speech, and common sense reasoning capabilities.

Steps 10-12 may be repeated a number of times with different posed questions to reduce the possibility that random guessing by a bot or other human imitating mechanism will succeed in providing correct answers and being taken for a human.

Step 10 may include generating a stimulus that is perceptible by one or more human senses and posing a question pertaining to the stimulus that is selected to exercise the human conceptual capability. For example, an image may be generated that is perceivable by the human sense of sight, e.g. an image of an object or of a living thing, and a question may be posed that pertains to the image. In another example, a sound may be generated that is perceivable by the human sense of hearing, e.g. a sound of a horse exhaling, a sound of a motorcycle roaring, and a question may be posed that pertains to a living thing or an object, e.g. a horse, a motorcycle, associated with the sound. In another example, both an image and a sound may be generated and a question may be posed that pertains to the image and sound. Multiple questions pertaining to the stimulus may be posed to reduce the chance that guessing will succeed in yielding correct answers.

A question at step 10 may be posed using spoken speech. For example, a question may be carried in an audio message. A question at step 10 may be posed using visual communication. For example, a question may be displayed in text form.

Steps 10-12 may be performed in any system that is capable of posing questions and/or generating stimuli and obtaining and verifying answers to posed questions. Examples include computer-based systems including networks of computer-based systems.

Figure 2:
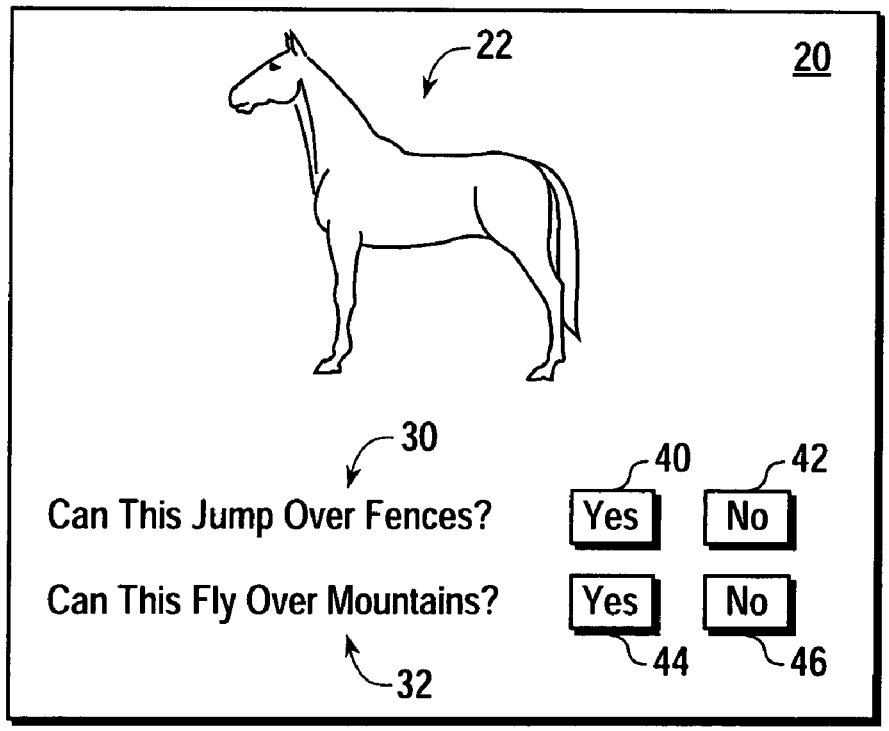
FIG. 2 shows a human test in a web form according to the present teachings.

FIG. 2 shows a human test in a web form 20 according to the present teachings. The web form 20 in this example includes an image 22, a set of questions 30-32, and a set of radio buttons 40-46. The radio buttons 40-42 correspond to the question 30 and are labeled "Yes" and "No," respectively. The radio buttons 44-46 correspond to the question 32 and are labeled "Yes" and "No," respectively.

The image 22 may be an image of a common object or of a living thing. The questions 30-32 pertain to the image 22 and are questions that may be answered either yes or no using the radio buttons 40-46.

In the example shown, the image 22 is an image of a horse. The question 30 is "Can this jump over fences?" The question 32 is "Can this fly over mountains?" A human being viewing the web form 20 would use their visual object recognition capability to recognize the horse and use their natural language processing capability to parse the questions 30-32 and their common sense reasoning capability to conclude that a horse can jump over fences but not fly over mountains. Thus, a human being would answer the question 30 by clicking the radio button 40 and answer the question 32 by clicking the radio button 46. Additional questions pertaining to the image of the horse may be posed to reduce the likelihood that guessing will defeat the human test in the web form 20.

In an alternative to a visual display of the questions 30-32, the questions "Can this jump over fences?" and "Can this fly over mountains?" may be sounded out using an audio mechanism associated with the system or device that renders the web form 20 to a human being. This alternative exercises a human capability to recognize and parse spoken speech. The radio buttons 40-46 may still be used to provide answers to the audio questions.

In yet another alternative, the image 22 representing a horse in the web form 20 may be replaced with a sound associated with a horse, e.g. an audible sound made by a horse.

A human test in a web form according to the present techniques may include one or more questions and corresponding yes/no radio buttons without an image or sound to which the questions pertain. For example, using the same concepts as above, the questions "Can a horse jump over fences?" and "Can a horse fly over mountains" may be posed. This may be used for a human being having both visual and auditory impairments. In another example, a question that is selected to exercise a human capability to recognize and parse spoken speech such as "Is today Tuesday?" may be posed. The question may be provided in a web form either visually or using audio spoken speech.

A human test in a web form according to the present techniques may include one or more questions each having a corresponding input field in the web form. For example, a question that is selected to exercise human capabilities such as "How much is 1+1?" may be posed. The question may be provided in a web form either visually or using audio spoken speech. The answer would be entered by a human being into the input field of the web form.

A web form according to the present techniques may include a set of radio buttons each corresponding to a possible answer to a posed question. For example, the question "Which country is New York City in?" may be posed and one radio button may be labeled "USA" and another radio button may be labeled "France" and another radio button may be labeled "Russia," etc.

Figure 3:
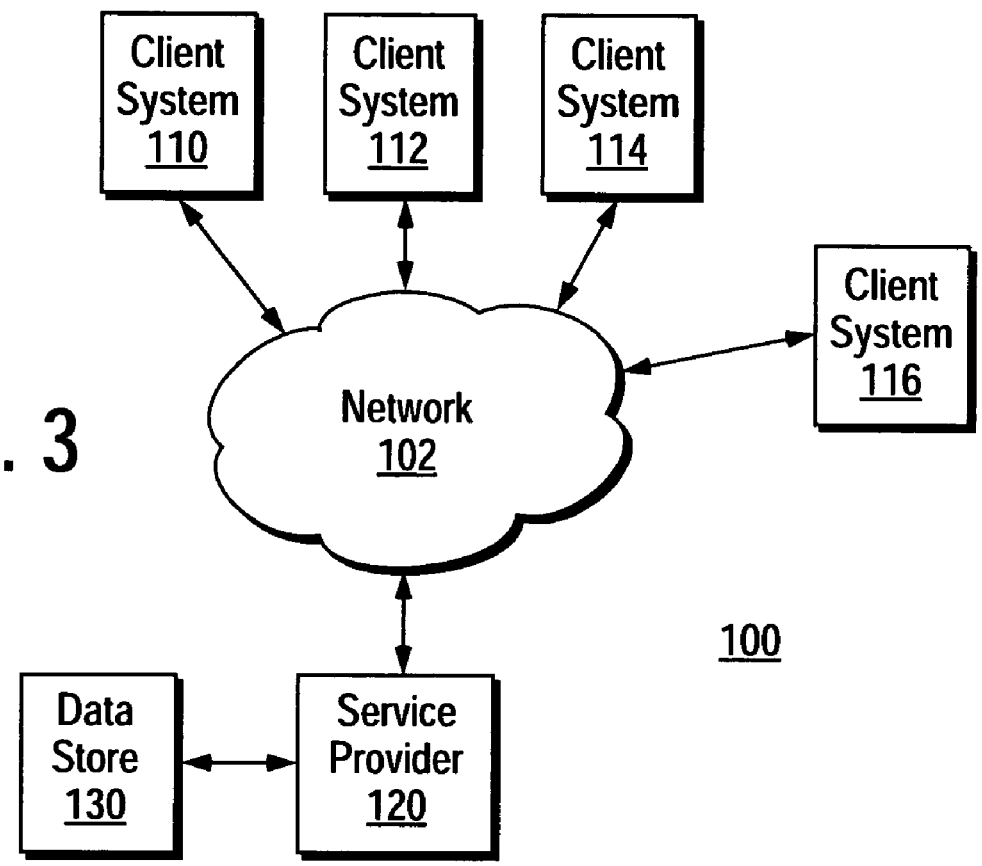
FIG. 3 shows a web-based system that incorporates the present teachings.

FIG. 3 shows a web-based system 100 that incorporates the present teachings. The system 100 includes a service provider 120 that provides a computer-related service via a network 102. The computer-related service is intended for use by individual users, i.e. by human beings. For example, the service provider 120 may include a web server including web forms that enable registration and access to the computer-related service.

Any one or more of a set of client systems 110-116 may attempt to subscribe to the computer-related service of the service provider 120. For example, a human being may use one of the client systems 110-116 to subscribe to the computer-related service of the service provider 120. In addition, a software program, i.e. a bot, running on any one of the client systems 110-116 may attempt to subscribe to the computer-related service of the service provider 120.

The client systems 110-116 use web protocols to obtain a registration form from the service provider 120 when attempting to subscribe to the computer-related service. For example, an individual user may use a web browser functionality of the client system 110 to obtain the registration form by clicking a button, hyperlink, etc., in a web page generated by the service provider 120 and a bot running on the client system 112 my obtain the registration form by analyzing a web page generated by the service provider 120 and extracting a URL for the registration form and then issuing HTTP get commands to obtain the registration form.

The registration form generated by the service provider 120 may include a human test according to the present techniques or may be shielded by a form containing a human test according to the present techniques. A human being using the client system 110 may view the registration form on a local display of the client system 110 and/or listen to audio content associated with the registration form via an audio subsystem of the client system 110. A human being using the client system 110 may employ a user input mechanism of the client system 110 to enter answers by clicking radio buttons and/or making entries into fields in the registration form.

The service provider 120 generates a human test by obtaining pre-selected images and/or sounds including pre-selected questions and their corresponding answers from a data store 130. The data store 130 may provide a relatively large variety of material for posing questions which may be used to provide variability in human tests and hinder attempts to discover and re-use human test answers. The data store 130 may be any type of store, e.g. a persistent storage media. In addition, the size, shape, colors, etc., of images to which posed question pertain may also be varied when generating a registration form.

Examples of a computer-related service of the service provider 120 that is designed for use by individual users include email services, personal web pages, personal data storage, web access accounts, ordinary user accounts etc.

A human test according to the present techniques may include measuring the time spent by a subject, e.g. a human or a bot, in answering the questions posed. Humans tend to process information more slowly than bots. Thus, if the time spent answering a posed question is very short, e.g. less than a second per question, then it may be concluded that a bot is answering the question rather than a human. For example, a registration form according to the present techniques may include an applet that measures response time to questions.

A human test according to the present techniques may be adapted to humans having disabilities, e.g. visual, auditory impairments, by stimulating different senses. For example, a question may be posed visually or may be sounded out. This is in contrast to prior visual systems which may not accommodate the blind.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for determining whether an originator of an access to a computer-based system is a human being or a computer-based program imitating a human being, comprising:

generating a computer-based message defining a human test which when rendered by another computer-based system using an output device presents a stimulus perceptible by one or more human senses such that the stimulus depicts an object that exists in the real-world and a question pertaining to the object wherein the question is selected to test human knowledge regarding a real-world capability of the object;

transmitting the computer-based message to the originator and receiving a computer-based message containing an answer to the question from the originator and determining whether the answer is correct.

2. The method of claim 1, further comprising determining whether a time spent by the originator answering the question is too fast for a human.

3. The method of claim 1, wherein the object is a living thing.

4. The method of claim 3, wherein the stimulus depicts the living thing visually.

5. The method of claim 3, wherein the stimulus depicts the living thing using sound.

6. The method of claim 1, wherein the object is an inanimate object.

7. The method of claim 6, wherein the stimulus depicts the inanimate object visually.

8. The method of claim 6, wherein the stimulus depicts the inanimate object using sound.

9. The method of claim 1, further comprising varying one or more visual characteristics of the object.

10. The method of claim 1, further comprising adapting the stimulus to a human disability.

11. The method of claim 1, wherein the question is selected to exercise a human capability to parse spoken speech.

12. The method of claim 1, further comprising obtaining a set of material for rendering the stimulus and the question from a data store that holds a set of pre-selected material for a variety of stimuli and questions.

13. The method of claim 12, wherein obtaining a set of material comprises varying one or more characteristics of the stimulus.

\* \* \* \* \*